United States Patent [19]

Kluytmans

[11] 4,165,701
[45] Aug. 28, 1979

[54] SEA-GOING CRAFT

[76] Inventor: P. H. Kluytmans, Sevaneta 350 B, Aruba, Netherlands Antilles

[21] Appl. No.: 854,264

[22] Filed: Nov. 23, 1977

Related U.S. Application Data

[63] Continuation-in-part of Ser. No. 735,752, Oct. 26, 1976, abandoned.

[51] Int. Cl.² ............................................... B63B 1/00
[52] U.S. Cl. ................................. 114/61; 114/145 R; 115/1 C
[58] Field of Search ...................... 114/39, 61, 145 R; 115/1 C

[56] References Cited

U.S. PATENT DOCUMENTS

| 1,712,758 | 5/1929 | Durand | 115/1 C |
| 2,807,228 | 9/1957 | Vandre | 114/145 R |
| 3,136,505 | 6/1964 | Fleury | 114/61 |
| 3,866,557 | 2/1975 | Lang | 114/61 |
| 3,981,259 | 9/1976 | Harper | 114/61 |

Primary Examiner—Trygve M. Blix
Assistant Examiner—D. W. Keen

[57] ABSTRACT

A craft for traveling on a surface of a sea, the craft including a pair of parallel, spaced-apart, elongated pontoons or floats mounted to the underside of a cabin, which thus is supported elevated above the water surface, the forward ends of the pontoons being tapered to a narrow edge, a rudder at a rear of each float, and a motor mounted upon the cabin turning an air-driving propeller for moving the craft on the water.

4 Claims, 7 Drawing Figures

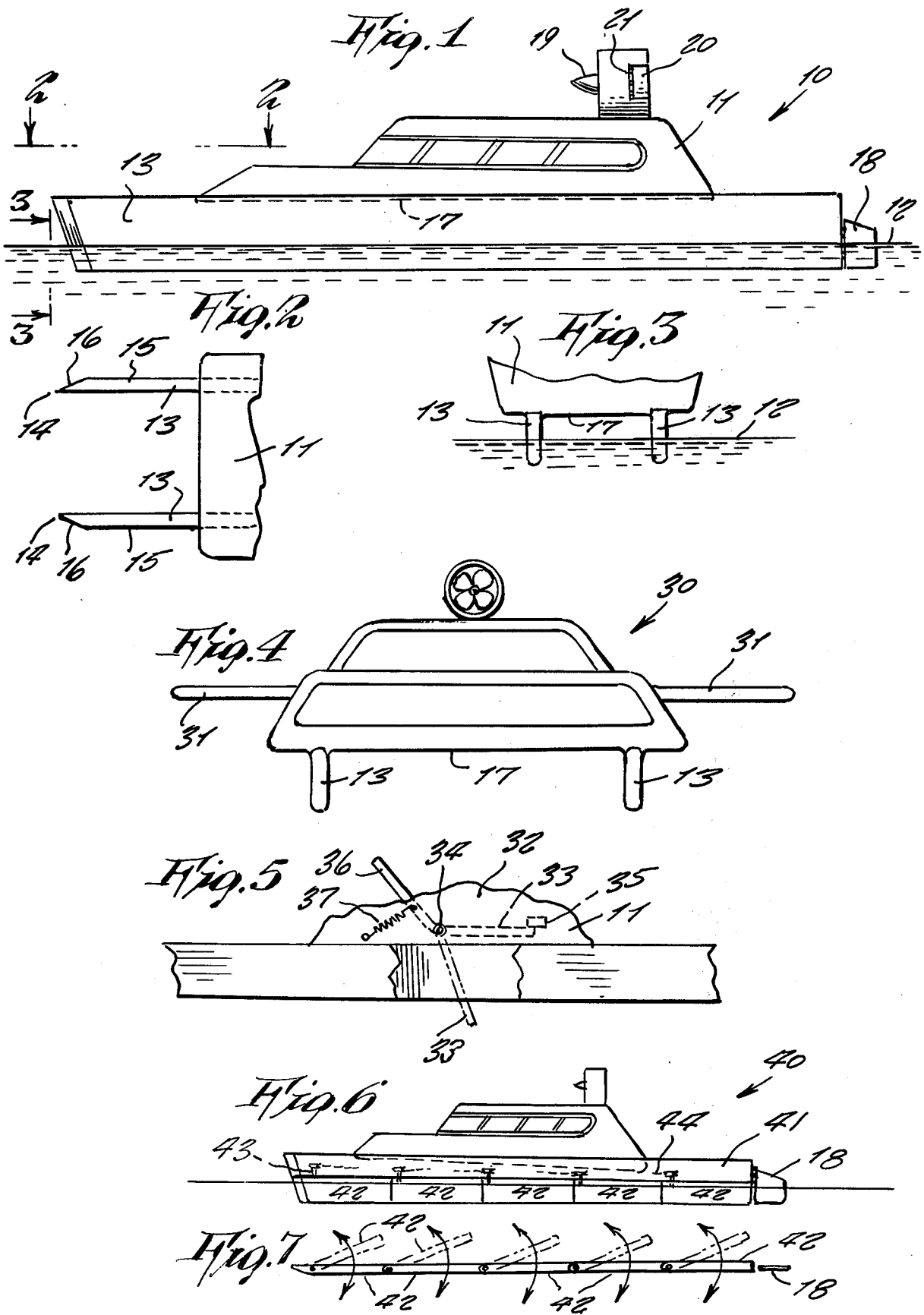

SEA-GOING CRAFT

This is a continuation-in-part of my prior application Ser. No. 735,752, filed Oct. 26, 1976, now abandoned.

This invention relates generally to water surface craft.

A principal object of the present invention is to provide a sea-going craft, in which a cabin hull is supported elevated above a water surface, by being mounted upon a pair of parallel, spaced-apart pontoons or floats, the craft, accordingly, having a performance between that of a hovercraft and a hydrofoil-type craft.

Another object of the present invention is to provide a sea-going craft, where there is no pounding of water against the underside of the cabin hull, due to its elevated position.

Another object is to provide a sea-going craft, which, due to its spaced-apart pontoons has a catamaran stability against rolling.

Yet another object is to provide a sea-going craft, in which the pontoons are hollow, containing air, so that the craft is unsinkable.

Yet a further object is to provide a sea-going craft, wherein the pontoons are relatively thin. They can thus move forwardly through the water with a minimum resistance, and thus the craft is able to travel faster with less power than a conventional sea-going craft, in which the entire hull rests upon the water.

Yet a further object is to provide a sea-going craft, which is adaptable for use in ocean racing, fishing, sports, as a fast passenger transport vessel, as a pilot craft, military or police missions, as well as coast guard duty.

Other objects are to provide a sea-going craft, which is simple in design, inexpensive to manufacture, rugged in construction, easy to use and efficient in operation.

These, and other objects, will be readily evident, upon a study of the following specification, and the accompanying drawing, wherein:

FIG. 1 is a side view of the present craft;

FIG. 2 is a fragmentary plan view, as shown on line 2—2 of FIG. 1;

FIG. 3 is a fragmentary front view, as viewed on line 3—3 of FIG. 1;

FIG. 4 is an end view of a modified design of the invention;

FIG. 5 is a fragmentary side view, showing a modified construction, wherein the craft includes a braking device between the floats, so as to brake against forward motion in the water;

FIG. 6 is a side view of a further modified design of sea-going craft, in which each pontoon is divided into a plurality of pivotable sections, in order that the craft can be maneuvered for quick turns, and FIG. 7 is a bottom view of one of the pontoons illustrated in FIG. 6.

Referring now to the drawing in greater detail, and more particularly, to FIGS. 1 through 3 thereof at this time, the reference numeral 10 represents a sea-going craft, according to the present invention, wherein there is a cabin hull 11, supported in elevated position above a water surface 12 by means of a pair of parallel, spaced-apart pontoons or floats 13, each one of which is longer than the cabin hull, and accordingly extends forwardly and rearwardly thereof. Each pontoon is relatively thin in width, and a forward ends of the pontoons are tapered to a sharp edge 14, by means of the outer sides 15 of each pontoon having an angular tapered portion 16 at its forward end. This design results in no turbulence of the water between the pontoons as the craft travels ahead. Thus, waves therebetween are reduced to a minimum, so that there is no pounding against the underside 17 of the cabin hull.

A rudder 18 is secured to a rear of each of the pontoons.

An engine 19, mounted on top of the cabin hull, is enclosed within a circular cowl, and drives a propeller for moving air through the cowl, and thus propel the craft ahead. Rudders 20, on each side of the cowl, are pivotable about hinges 21, and serve to aid the craft in directional turning.

In a modified design, shown in FIG. 4, a sea-going craft 30 is generally a same as craft 10, except that it additionally includes a pair of sidewardly extending wings 31, which, as they move through the air as the craft travels, thus serve to stabilize the craft against additional rolling force. Additionally, such wings can add lift, if the wings include an aircraft-type airfoil design.

In FIG. 5, a braking device 32 is shown installed within the cabin hull 11, and which serves to brake the forward movement of the craft, when so desired. A brake plate 33 is pivotably secured between opposite side walls of the cabin hull, and pivot about a transverse shaft 34, so that the plate is thus moveable downwardly in to water, as shown by the dot dash line position, and an inoperative position as indicated by the dotted lines, wherein the brake plate is raised upwardly horizontally to rest against a stop 35. A hand operated lever 36 serves to pivot the plate against the action of a spring 37, that serves to return the plate against the stop.

In FIGS. 6 and 7, another design of sea-going craft 40 is a same as above described craft 10, except that, in this design, each pontoon 41 includes a lower portion thereof, divided into a plurality of sections 42, each one of which is pivotable near its forward end above a vertical shaft 43, so that the section is pivotable toward either side from the straight longitudinal line as shown in FIG. 7. Each shaft 43 is pivotable by means of controls 44 extending to the control cabin within the hull. Thus, in this design, the craft can be made to make sharp turns, which otherwise would not be possible, if the pontoon were a single rigid construction. Each section of the entire length of the pontoon thus serves as a rudder, which is of relatively very short length, when compared to the entire length of the pontoon.

It is now evident that there is provided a sea-going craft, which, due its elevated cabin hull, will not slam and pound against the water surface, and wherein the craft is very stable, as well as very maneuverable.

While various changes may be made in the detail construction, it is understood that such changes will be within the spirit and scope of the present invention, as is defined by the appended claims.

What I now claim is:

1. A sea-going craft, comprising, in combination, a cabin hull secured to a pair of parallel, spaced apart floats or pontoons having engine means for driving an air propeller, in order to provide thrust for movement of said craft in the water, the forward ends of said floats each having a sidewardly, angularly inclined front surface on its outer side, so as to converge in a forwardly direction, in order to reduce water turbulence between said floats, said floats extending forwardly of a front end of said cabin hull as well as rearwardly of a rear of said cabin hull for maximum stability, said floats each having a constantly same cross-sectional configuration rearwardly of said front inclined wall surfaces, and said floats elevating a bottom of said cabin hull above said water, said engine being secured fixedly upon a top of said cabin hull; said engine, together with its propeller, being within a circular cowl having rudder means that includes rudders on each side of said cowl, said rudders being pivotally attached to said cowl by hinges so as to directionally turn said craft.

2. The combination as set forth in claim 1, wherein a lower portion of said floats is comprised of a plurality of individually pivotable sections, so as to form a plurality of rudders, said sections being adjacent each other with a forward edge of one being adjacent a rear edge of a next said section.

3. The combination as set forth in claim 2, wherein said craft includes a pair of sidewardly extending wings extending in the air for additional stability.

4. The combination as set forth in claim 3, wherein a manually operated brake is located between said floats.

* * * * *